United States Patent Office 2,991,258
Patented July 4, 1961

2,991,258
ADHESIVE COMPOSITION COMPRISING THE REACTION PRODUCT OF A VINYL PYRIDINE AND A RUBBER, AND METHOD OF MAKING SAME
Robert Nobbs Haward, Bowdon, Dov Katz, Sale, and Alec Norman Roper, Eccles, Manchester, England, assignors, by mesne assignments, to Shell Oil Company, New York, N.Y., a corporation of Delaware
No Drawing. Filed Jan. 3, 1956, Ser. No. 556,781
Claims priority, application Great Britain Feb. 25, 1955
11 Claims. (Cl. 260—4)

This invention is concerned with improvements in and relating to polymeric products suitable for use in adhesive compositions and to adhesive compositions incorporating the polymeric products.

Adhesive compositions comprising a copolymer of a diene hydrocarbon, such as 1,3-butadiene or isoprene, and a vinyl pyridine selected from alpha and gamma vinyl pyridines and their homologues, together with from 10 to 90% by weight of a heat convertible phenol-aldehyde resole are disclosed in British patent specification No. 595,290. It is also stated in the latter specification that three component copolymers containing at least 50% diene and 5% vinyl pyridine, the remainder consisting of other vinyl compounds such as styrene, vinylidene chloride, methyl vinyl ketone, vinyl naphthalene, methyl methacrylate, acrylonitrile or dimethyl fumarate are also operable. The copolymers described in British patent specification No. 595,290, are true copolymers formed by polymerising a mixture of all the components of the copolymer in monomeric form, whereby polymer chains containing the monomeric units in a relatively uniform distribution are obtained.

The diene hydrocarbons required for the production of the copolymers referred to above are not always readily available. Butadiene which is the most readily available has to be transported under pressure and furthermore the copolymerisation with butadiene has to be carried out under pressure. Other diene hydrocarbons, in addition to being not so readily available, are comparatively expensive.

It has now been found that polymeric products which are highly satisfactory for use in adhesive compositions can be manufactured by polymerising a vinyl pyridine with at least one other polymerisable organic compound containing an ethylenic double bond in the molecule in emulsion in a latex of a rubber polymer containing ethylenic double bonds. Latices of natural or synthetic rubbers which are widely and readily available may be used in this process and the polymerisation reaction may be carried out under atmospheric pressure, thus avoiding the need for pressure resistant reactors. Synthetic rubber latices are normally produced on a very large scale by plants conveniently situated for the supply of raw materials.

By the polymerisation of vinyl pyridine and another compound in emulsion in a rubber latex as referred to above, there are obtained novel polymeric products which contain so-called graft polymers i.e. polymers formed of the rubber polymer chains having attached or grafted thereon chains formed of the monomeric starting materials. (See Bloomfield, Merret, Popham and Swift, Proc. Third Rubber Tech. Conference, London, June 22–25, 1954.) Thus even when the monomeric units of the graft polymers consist of vinyl pyridine, styrene and butadiene, obtained by polymerising vinyl pyridine and styrene in a butadiene/styrene copolymer latex, the graft polymer will be different from the copolymer obtained as described in British patent specification No. 595,290 from vinyl pyridine, butadiene and styrene monomers, in that the distribution of the monomeric units in the polymer chains will be entirely different. The main chains of the graft polymer will contain only butadiene and styrene units and vinyl pyridine units will appear only in the side chains. Furthermore, in the grafting process copolymer chains are not formed from vinyl pyridine and butadiene units as in the process of British patent specification No. 595,290.

The invention consists in a process for the production of polymeric products suitable for use in adhesive compositions, which comprises polymerising a vinyl pyridine and at least one other polymerisable organic compound containing an ethylenic double bond in emulsion in a latex of a rubber polymer containing ethylenic double bonds.

The invention also consists in the novel polymeric products containing graft polymers produced by the process referred to in the preceding paragraph.

The polymeric products of the invention are eminently suitable for use in adhesive compositions in conjunction with phenol-aldehyde resole resins of the kind described in British patent specification No. 595,290, and the invention further consists in adhesive compositions comprising these polymeric products and from 10 to 90% by weight, on a dry weight basis, of heat-convertible phenol-aldehyde resoles.

The rubber polymer used in the process of the invention may be any organic polymer containing ethylenic double bonds which has rubber like characteristics i.e. elastic recovery and high stretch. Thus natural rubber or a synthetic rubber consisting of a butadiene/styrene copolymer, a butadiene/acrylonitrile copolymer or polychloroprene may be used in latex form in the process of the invention.

The vinyl pyridine used in the process of the invention may be 2-vinyl pyridine, 3-vinyl pyridine or 4-vinyl pyridine or derivatives thereof substituted in the nucleus by one or more lower alkyl radicals e.g. 5-ethyl- or 5-methyl-2-vinyl pyridine. A mixture of such vinyl pyridines may also be used.

The one or more other polymerisable monomeric compounds which may be used with a vinyl pyridine in the process of the invention are preferably polymerisable compounds which contain a $CH_2:C<$ group and are liquid at the reaction temperature employed. Examples of such other compounds are styrene, acrylic acid esters, methacrylic acid esters, vinyl toluene and acrylonitrile. As the other polymerisable compounds, solid monomeric compounds may also be used in solution in other liquid monomers or in inert solvents e.g. phenyl vinyl ketone in solution in styrene or benzene. When an inert solvent such as benzene is used, this is stripped from the latex at the end of the reaction. Compounds, such as ethyl benzylidene-cyanacetate, which contain an ethylenic double bond, but not a $CH_2:C<$ group, and are not normally polymerisable by themselves, may further be used in conjunction with a molar excess of a compound containing a $CH_2:C<$ group. Thus when such unsaturated compounds which do not contain the $CH_2:C<$ group are used, a polymerisable compound containing a $CH_2:C<$ group, e.g. styrene, is added to the mixture to be polymerised to obtain the required molar excess without increasing the consumption of vinyl pyridine unnecessarily.

The process of the invention may be carried out by emulsifying the vinyl pyridine and other monomer or monomers in the rubber latex with the aid of the usual dispersing agents e.g. sodium oleate, potassium oleate, polyvinyl alcohol and sodium resinate, and then polymerising the emulsified mixture. The whole of the monomers, including the vinyl pyridine, to be utilised may be added to the latex with or preferably part only, at least of the monomers other than vinyl pyridine, is added at the beginning and the remainder is added in one or more stages as the polymerisation proceeds. Polymerisation may be effected with the aid of a free radical type polymerisation catalyst e.g. tertiary butyl hydroperoxide, benzoyl peroxide and potassium persulphate. So-called redox systems in which a catalyst and activator, e.g. tertiary butyl hydroperoxide and diethyl triamine, are used may advantageously be employed. The temperature of reaction with such catalysts or catalyst systems may be from 0 to 100° C. and is preferably between 40 and 70° C.

As the vinyl pyridine has on objectionable odour it is desirable to ensure that it is completely polymerised. For this purpose the other monomer or monomers may be added in a number of stages during the course of polymerisation.

The starting materials may be reacted in the following proportions to produce the polymeric products of the invention:

Vinyl pyridine, 2 to 40% and preferably 5 to 20%.
Other monomers, 5 to 80% and preferably 20 to 60%.
Rubber latex (as solids), 15 to 90% and preferably 30 to 70%.

The percentages quoted are percentages by weight and are based on the combined weight of vinyl pyridine, other monomers and rubber (as solids) subjected to polymerisation.

The preferred starting materials for use in the process of the invention are

*Rubber polymer.*—a butadiene/styrene copolymer.
*Vinyl pyridine.*—2-vinyl pyridine.
*Other monomers.*—methyl methacrylate, styrene or a mixture of styrene and acrylonitrile, methyl methacrylate or butyl acrylate.

The heat convertible resole resins used in the adhesive compositions of the invention may be prepared in known manner from aldehydes and phenols. Most suitably they may be prepared by reacting formaldehyde with resorcinol in aqueous solution in the presence of an alkaline catalyst and in molar ratios of from 0.7 to 6 mols of formaldehyde to one mole of resorcinol. The adhesive compositions may contain from 10 to 90% of such resole resins. The adhesive compositions are suitable for use in tyre manufacture and for this purpose preferably contain from 10 to 40% of resole resin. These percentages are on a dry weights basis.

The invention is illustrated by the following examples in which all parts and percentages referred to are by weight.

In Examples 1 to 14 the equipment used for emulsification and polymerisation was a glass-lined reactor equipped with a reflux condenser, an efficient stirrer and a gas inlet. The polymerisations were carried out under reflux with continuous stirring and a nitrogen blanket was maintained over the surface of the liquid throughout the period of reaction.

The Polysar Latex II and Polysar Latex IV referred to in the examples are synthetic rubber latices sold under these designations by the Polymer Corporation of Sarnia, Canada. Polysar Latex II is a latex of a synthetic rubber consisting of a copolymer of butadiene and styrene, in which the ratio by weight of butadiene to styrene is about 76 to 24, and contains about 27% by weight of polymer solids. Polysar Latex IV is a latex of a synthetic rubber consisting of a copolymer of butadiene and styrene in which the ratio by weight of butadiene to styrene is 50 to 50 and contains about 42% by weight of polymer solids.

*Example 1*

24 parts of styrene and 30 parts of 2-vinyl pyridine were emulsified in a latex consisting of 284 parts of Standard Revertex (natural rubber latex, 74% w./w. solids), 376 parts of water and 13.5 parts of potassium oleate in the reactor referred to above. 3 parts of tertiary butyl hydroperoxide and 1 part of diethyl triamine were added and the contents of the reactor were heated to 55° C. with vigorous stirring. After 3 hours heating at 55° C., 18 parts of styrene, 1.5 parts of tertiary butyl hydroperoxide and 0.5 part of diethyl triamine were added to the reaction mixture and after another 3 hours heating at the same temperature a further addition of 18 parts of styrene, 1.5 parts of tertiary butyl hydroperoxide and 0.5 part of diethyl triamine took place. The reactor was heated for a total of 22 hours at 55° C., and for an additional 2 hours at 65° C. The resulting stable latex was cooled and filtered through steel wool to remove any traces of coagulum present. The latex contained 41–42% of solids.

*Example 2*

A latex with a similar solids content to that produced in Example 1 was prepared in a similar manner to that described in Example 1 except that the whole of the styrene, tertiary butyl hydroperoxide and diethyl triamine was added at the beginning of the reaction.

*Example 3*

15 parts of styrene and 15 parts of 2-vinyl pyridine were emulsified in 420 parts of Polysar Latex II and 6.75 parts of potassium oleate. 1.5 parts of tertiary butyl hydroperoxide and 0.5 part of diethyl triamine were added and the contents of the reactor were heated with vigorous stirring to 55° C. After 5 hours heating at 55° C. an additional 15 parts of styrene, 1.5 parts of tertiary butyl hydroperoxide and 0.5 part of diethyl triamine were added to the reaction mixture. The complete reaction cycle was 22 hours at 55° C. followed by 2 hours at 65° C. After cooling and filtering through steel wool a latex with about 35% of solids was obtained.

*Example 4*

A latex containing about 37% of solids was prepared in the following manner. 30 parts of styrene and 30 parts of 2-vinyl pyridine were emulsified in 720 parts of Polysar Latex II containing 18 parts of potassium oleate. 2.4 parts of tertiary butyl hydroperoxide and 0.8 part of diethyl triamine were added and the reaction was started by heating up the well agitated reaction mixture to 55° C. After 3 hours heating at 55° C., 30 parts of styrene, 1.8 parts of tertiary butyl hydroperoxide and 0.6 part of diethyl triamine were added, and the composition of the latex was fixed by the addition after a further 3 hours heating, of 30 parts of styrene, 1.8 parts of tertiary butyl hydroperoxide and 0.6 part of diethyl triamine. The complete reaction cycle was 22 hours at 55° C. and an additional 2 hours at 65° C. The resulting latex was cooled and filtered.

*Example 5*

15 parts of methyl methacrylate and 15 parts of 2-vinyl pyridine were emulsified in 360 parts of Polysar Latex II containing 3 parts of potassium oleate and 1.5 parts of potassium persulphate. The mixture was heated to 55° C. with vigorous stirring. After 2 hours of heating at this temperature 15 parts of methyl methacrylate were added to this mixture and after a further 2 hours heating an additional 15 parts of methyl methacrylate were added. 6 hours after the commencement of the reaction the temperature was raised to 65° C. and heating continued at the latter temperature for a further 2 hours, the total heating cycle being 8 hours. After cooling and filtering, a latex product was obtained containing 37% of solids.

Example 6

45 parts of commercial vinyl toluene (mixture of para and meta isomers supplied by the Dow Chemical Corporation, United States of America) and 30 parts of 2-vinyl pyridine were emulsified in 720 parts of Polysar Latex II containing 18 parts of potassium oleate. 1 part of diethyl triamine and 3 parts of tertiary butyl hydroperoxide were added and the mixture was heated to 55° C. with stirring. After 3 hours heating at this temperature 22.5 parts of vinyl toluene, 0.5 part of diethyl triamine and 1.5 parts of tertiary butyl hydroperoxide were added to the reaction mixture. After a further 3 hours heating at 55° C. an additional 22.5 parts of vinyl toluene, 0.5 part of diethyl triamine and 1.5 parts of tertiary butyl hydroperoxide were added. Heating at 55° C. was continued up to a total of 22 hours, after which the reaction mixture was heated for a further 2 hours at 65° C. After cooling and filtering a product containing about 38% of solids was obtained.

Example 7

15 parts of styrene and 15 parts of 2-vinyl pyridine were emulsified in 360 parts of Polysar Latex II containing 0.75 part of Rhodoviol HS100 (high viscosity polyvinyl alcohol, 85% hydrolysed). After adding 1.2 parts of tertiary butyl hydroperoxide and 0.4 part of diethyl triamine, heating was commenced at 55° C. with stirring. After 2 hours heating at this temperature, 15 parts of styrene, 0.9 part of tertiary butyl hydroperoxide and 0.3 part of diethyl triamine were introduced. After a further 2 hours heating a further addition was made of 15 parts of styrene, 0.9 part of tertiary butyl hydroperoxide and 0.3 part of diethyl triamine. The heating cycle was similar to that followed in Example 5. The product was allowed to cool and was filtered. It contained about 37% of solids.

Example 8

32 parts of styrene and 16 parts of 5-methyl-2-vinyl pyridine were emulsified in 320 parts of Polysar Latex II containing 4 parts of potassium oleate and 1.6 parts of potassium persulphate. The reaction mixture was heated, with stirring, to 55° C. After 2 hours, 16 parts of styrene were added and after a further 2 hours another 16 parts of styrene were added. The heating cycle followed was similar to that followed in Example 5. The solids content of the final product, after cooling and filtering, was about 39%.

Example 9

88 parts of styrene and 35 parts of 2-vinyl pyridine were emulsified in 560 parts of Polysar Latex II containing 31.5 parts of potassium oleate. After the addition of 1.15 parts of diethyl triamine and 3.5 parts of tertiary butyl hydroperoxide the reaction mixture was heated to 55° C. with stirring. After 3 hours heating 43.5 parts of styrene, 0.6 part of diethyl triamine and 1.75 parts of tertiary butyl hydroperoxide were added and after a further 3 hours this addition was repeated. The heating cycle was similar to that adopted in Example 6. The product obtained, after cooling and filtering, contained about 46% of solids.

Example 10

600 parts of styrene and 600 parts of 2-vinyl pyridine were emulsified in 14,400 parts of Polysar Latex II containing 120 parts of soap and 60 parts of potassium persulphate. The reaction mixture was heated to 55° with stirring. After 2 hours heating at this temperature 600 parts of styrene were added. After a further 2 hours heating a final addition of 600 parts of styrene was made. 6 hours after the commencement of the reaction the temperature was raised for an additional 2 hours to 65° C. On completion of the reaction the latex was allowed to cool and filtered through a sieve. The solids content of the product was 37%.

Example 11

17.5 parts of a mixture of styrene and acrylonitrile in a ratio of 2 parts of styrene to 1 part of acrylonitrile were emulsified with 15 parts of distilled 2-vinyl pyridine in 330 parts of Polysar Latex II containing 3.38 parts of potassium oleate and 1.5 parts of potassium persulphate. The reaction mixture was heated with stirring to 55° C. After 2 hours heating at this temperature, a further 17.5 parts of the mixture of styrene and acrylonitrile were introduced and heating at 55° C. was continued. After a further 2 hours an additional 17.5 parts of the styrene/acrylonitrile mixture was added. After a total of 6 hours heating at 55° C., the temperature was raised to 65° C. and this temperature was maintained for an additional 2 hours. The product was allowed to cool and was then filtered. The product had a solids content of 39 to 40%.

Example 12

Example 11 was repeated with a mixture of styrene and methyl methacrylate, in a ratio of 2 parts of styrene to 1 part of methyl methacrylate, in place of the mixture of styrene and acrylonitrile. The product had a solids content of 39 to 49% by weight.

Example 13

Example 11 was repeated with a mixture of styrene and butyl acrylate, in a ratio of 2 parts of styrene to 1 part of butyl acrylate, in place of the mixture of styrene and acrylonitrile. The product had a solids content of 39 to 40%.

Example 14

15 parts of styrene and 15 parts of 2-vinyl pyridine were emulsified in a latex consisting of 242 parts of Polysar Latex IV and 100 parts of water and containing 0.9 parts of potassium oleate. 1.5 parts of potassium persulphate were added and the mixture was heated to 55° C. After 2 hours heating at this temperature a further 15 parts of styrene were added. Heating was continued for a further 4 hours at 55° C. and then for 2 hours at 65° C. The resulting latex was cooled and filtered. The product had a solids content of 37%.

Example 15

A resorcinol-formaldehyde resin solution was prepared from the following components:

| | Parts by weight |
|---|---|
| Water | 238.4 |
| Resorcinol | 11.0 |
| Formaldehyde (37% aqueous solution) | 16.2 |
| Sodium hydroxide | 0.3 |
| | [1] 265.9 |

[1] Total solids content 6.5%.

The sodium hydroxide, resorcinol and formaldehyde were dissolved successively in the water, each component being completely dissolved before the next component was added. After complete solution had been effected, the reaction was allowed to continue for 6 hours at 75°–78°F.

Adhesive compositions were prepared by mixing each of the latices produced by Examples 1 to 14 with resin solution produced as described in Example 15 in the following proportions:

| | Parts dry weight |
|---|---|
| Vinyl pyridine latex | 100.0 |
| Resorcinol-formaldehyde resin solution | 17.3 |

The adhesive compositions formed with the latices produced by Examples 1 to 4 were diluted with water to a solids content of 20%. Those formed with the latices of Examples 5 to 14 were diluted with water to a solids content of 12.5%.

The 14 adhesive compositions thus produced and diluted were tested for adhesion in the following manner.

In the following description and in the results given below, the compositions tested are referred to by the numbers of the examples by which the respective latices used in the compositions were produced.

The adhesive compositions were applied to strips of nylon cloth, 1 inch in width, by dipping and the strips were then dried.

The nylon strips treated with compositions 1 to 9 were dried at room temperature for 2½ hours. Those treated with compositions 10 to 15 were dried at 105° C. for 15 minutes.

The take-up of adhesive expressed as percent dry weight of adhesive on weight of untreated nylon cloth was 11 to 13% for compositions 1 to 4 and 7 to 8% for compositions 5 to 14. Each of the nylon strips treated with adhesive was attached to a natural rubber tyre carcase stock. The composite articles were then press cured at 141° C. for from 30 to 45 minutes. The test specimens formed in this manner were tested 24 hours after curing by the A.S.T.M. (American Society for Testing Materials) Test D413–39 "Adhesion of Vulcanised Rubber" using the machine method. The temperature of testing was 25° C.

The natural rubber tyre carcase stocks used in forming the test specimens were of the following compositions.

|  | Rubber Stock A | Rubber Stock B |
|---|---|---|
| Rubber | 100 | 100 |
| Carbon Black |  | 15 |
| Zinc Oxide | 5 | 20 |
| Anti-oxidant |  | 1.5 |
| Stearic Acid | 0.5 | 1.5 |
| Pine Tar |  | 2 |
| Sanocure | 1 | 0.6 |
| Sulphur | 2.5 | 2.25 |
| Diphenyl Guanidine | 0.25 |  |
| Clay | 25 |  |

The results obtained in these tests and in a number of control tests carried out with the resin solution alone are as follows.

| Adhesive Composition | Rubber Stock | Adhesive Strength, lbs. per sq. inch. |
|---|---|---|
| Resin solution (control) | A and B | 2.8–4.0 |
| 1 | A | 7.1 |
| 2 | A | 6.4 |
| 3 | A | 20.4 |
| 4 | A | 18.7 |
| 5 | A | 17.8 |
| 6 | A | 5.7 |
| 7 | A | 16.6 |
| 8 | A | 12.7 |
| 9 | A | 8.2 |
| 10 | B | 24.5 |
| 11 | B | 26.2 |
| 12 | B | 19.2 |
| 13 | B | 21.4 |
| 14 | B | 23.2 |

It was found generally that improved adhesion was obtained when the treated nylon cloth was dried at 105° C. and when Rubber Stock B was used. Thus composition 10 which gave an adhesive strength of 15.3 with a treated nylon cloth dried at room temperature and Rubber Stock A gave an adhesive strength of 24.5 with a treated nylon cloth dried at 105° C. and with Rubber Stock B.

The results show that satisfactory adhesive compositions for use in tyre manufacture can be formed by blending latices of polymeric products produced in accordance with the invention with phenol-aldehyde resole resins. The chemical name of the Santocure referred to above is N-cyclohexyl-2-benzothiazyl-sulphenamide.

We claim:

1. The graft copolymer which comprises the reaction product of a mono-vinyl pyridine selected from the group consisting of 2-vinyl pyridine, 3-vinyl pyridine, 4-vinyl pyridine and corresponding vinyl pyridines having lower alkyl substituents on the nucleus thereof, at least one other polymerizable organic monomer containing a single $CH_2=C=$ group and which is liquid at a temperature from 0° to 100° C. and atmospheric pressure, and a rubbery polymer selected from the group consisting of natural rubber, butadiene-styrene copolymer, butadiene-acrylonitrile copolymer and polychloroprene, said reaction product being obtained by polymerizing said olefinic components in an emulsion in which the total portion of mono-vinyl pyridine, other polymerizable organic monomer, and rubbery polymer is present in proportions of from about 5 to 20%, from about 20 to 60% and from about 30 to 70%, by weight, respectively, based on the combined weight of the mono-vinyl pyridine, other polymerizable organic monomer and rubbery polymer.

2. The product of claim 1 in which the pyridine is 2-vinyl pyridine, the other monomer is styrene and the rubbery polymer is butadiene-styrene copolymer.

3. The product of claim 1 in which the pyridine is 2-vinyl pyridine, the other monomers comprise styrene and another polymerizable liquid, organic monomer containing a single $CH_2=C<$ group and the rubbery polymer is butadiene-styrene copolymer.

4. The product of claim 1 in which the rubbery polymer is butadiene-acrylonitrile copolymer.

5. The product of claim 1 in which the rubbery polymer is natural rubber.

6. An adhesive composition comprising the polymeric product of claim 1 and a heat-convertible phenol-formaldehyde resole resin, in which the resole resin constitutes from about 10 to 90%, by weight, of the combined weight of the polymeric product and resole resin.

7. The polymer which comprises the reaction product obtained by reacting a mono-vinyl pyridine selected from the group consisting of 2-vinyl pyridine, 3-vinyl pyridine, 4-vinyl pyridine and the corresponding pyridines having lower alkyl substituents on the nucleus thereof, at least one other polymerizable organic monomer containing a single $CH_2=C=$ group and which is liquid at a temperature from 0° to 100° C. and atmospheric pressure, and a rubbery polymer selected from the group consisting of natural rubber, butadiene-styrene copolymer, butadiene-acrylonitrile copolymer and polychloroprene in an aqueous emulsion.

8. The product of claim 7 in which the said other polymerizable monomer is selected from the group consisting of styrene, methyl methacrylate, butylacrylate, and acrylonitrile.

9. A process for the production of polymeric products which comprises adding a mono-vinyl pyridine selected from the group consisting of 2-vinyl pyridine, 3-vinyl pyridine, 4-vinyl pyridine and the corresponding pyridines having lower alkyl substituents on the nucleus thereof and at least one other polymerizable organic monomer containing a single $CH_2=C=$ group and which is liquid at a temperature from 0° to 100° C. and atmospheric pressure to a latex of a rubbery polymer of a conjugated diene selected from the group consisting of natural rubber, butadiene-styrene copolymer, butadiene-acrylonitrile copolymer, and polychloroprene in proportions such that the mono-vinyl pyridine, other polymerizable organic monomer and rubbery polymer are from about 5 to 20%, from about 20 to 60% and from about 30 to 70%, respectively, based on the combined weight of the mono-vinyl pyridine, other polymerizable organic monomer and rubbery polymer, agitating the mixture with sufficient dispersing agent to form an emulsion and polymerizing the olefinic materials by the addition of a free radical polymerization catalyst and retaining the mixture at a temperature of between 0 and 100° C.

10. The process of claim 9 in which part only of the other polymerizable organic compound is added to commence with, the remainder being added in stages during the polymerizing reaction.

11. The process of claim 9 in which the other polymerizable organic monomer is selected from the group consisting of styrene, methyl methacrylate, butylacrylate, and acrylonitrile.

References Cited in the file of this patent

UNITED STATES PATENTS

| | | |
|---|---|---|
| 2,462,390 | Harmon | Feb. 22, 1949 |
| 2,561,215 | Mighton | July 17, 1951 |
| 2,614,089 | Harrison et al. | Oct. 14, 1952 |
| 2,744,044 | Toulmin | May 1, 1956 |
| 2,859,201 | Uraneck et al. | Nov. 4, 1958 |

FOREIGN PATENTS

| | | |
|---|---|---|
| 499,577 | Canada | Jan. 26, 1954 |